Jan. 28, 1964  E. A. RICHLEY ETAL  3,119,232
ROCKET ENGINE
Filed Oct. 4, 1960  4 Sheets-Sheet 1
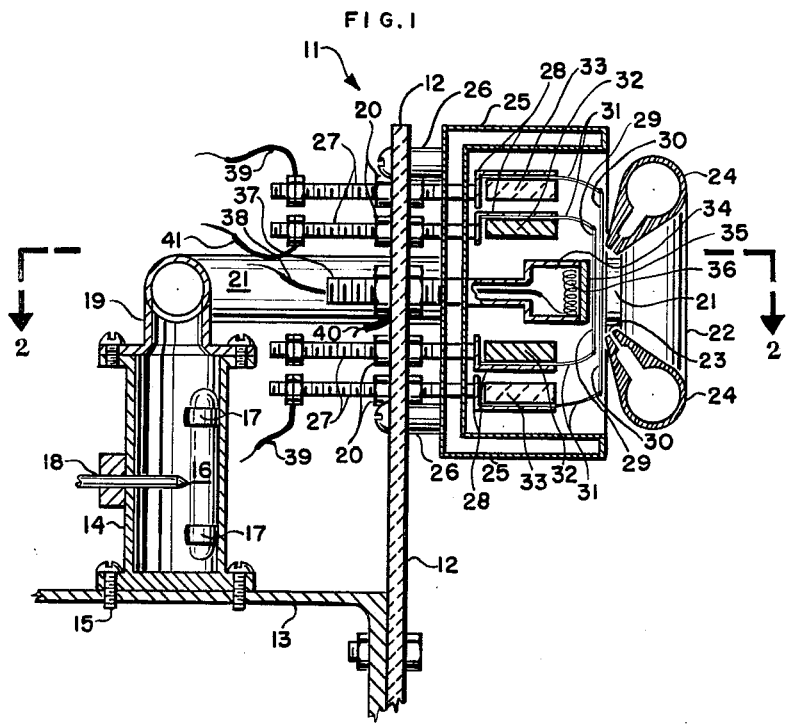
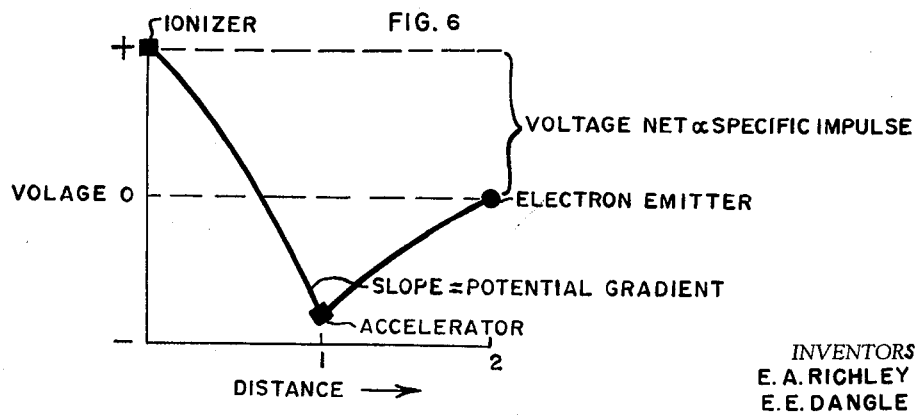
INVENTORS
E. A. RICHLEY
E. E. DANGLE
J. D. WEAR
BY
ATTORNEY Jan. 28, 1964  E. A. RICHLEY ETAL  3,119,232
ROCKET ENGINE Filed Oct. 4, 1960  4 Sheets-Sheet 2

INVENTORS
E. A. RICHLEY
E. E. DANGLE
J. D. WEAR

BY

ATTORNEY

Jan. 28, 1964 E. A. RICHLEY ETAL 3,119,232
ROCKET ENGINE
Filed Oct. 4, 1960 4 Sheets-Sheet 3

INVENTORS
E. A. RICHLEY
E. E. DANGLE
J. D. WEAR

BY
ATTORNEY

Jan. 28, 1964   E. A. RICHLEY ETAL   3,119,232
ROCKET ENGINE

Filed Oct. 4, 1960   4 Sheets-Sheet 4

DISTANCE ⟶

INVENTORS
E. A. RICHLEY
E. E. DANGLE
J. D. WEAR

BY

ATTORNEY

3,119,232
ROCKET ENGINE

Edward A. Richley, Cleveland, Eugene E. Dangle, Oberlin, and Jerrold D. Wear, North Olmsted, Ohio, assignors to the United States of America as represented by the Administrator of the National Aeronautics and Space Administration
Filed Oct. 4, 1960, Ser. No. 60,531
4 Claims. (Cl. 60—35.5)
(Granted under Title 35 U.S. Code (1952), sec. 266)

The invention described herein may be manufactured and used by or for the Government of the United States of America for governmental purposes without the payment of any royalties thereon or therefor.

This invention concerns an ion rocket configuration employing surface ionization and having grid electrodes of closely spaced wires.

The interest in ion rockets evolves from their potential for supplying extremely high values of specific impulse. Chemical rockets are limited to values of specific impulse in the neighborhood of 400 seconds by the available chemical enthalpy in the propellants. Nuclear thermal rockets are limited to a specific impulse of around 800 seconds by materials limitations. However, ion rockets can provide a specific impulse of 10,000 seconds or even higher if desired. Although the powerplant required to generate the electric power is quite heavy, ion rockets nevertheless offer overall weight savings when compared with the lower specific impulse propulsion systems for many space missions.

For each mission there is some optimum specific impulse that results in the lowest combined powerplant and propellant weight. For nuclear turbo electric power systems and for reasonable extrapolations of current technology, it appears that a thrust-weight ratio of about $10^{-4}$ $g$ can be achieved and a specific impulse of 10,000 seconds is about optimum for a roundtrip Mars mission. Longer missions will require higher values of specific impulse. Low values of specific impulse are of interest for orbit adjustment of satellites. For short propulsion time in high powerplant specific weight, the optimum specific impulse can be as low as 1000 seconds if the ion rocket efficiency is assumed to be independent of specific impulse. The ion rocket engine of this invention is one that will fall in the category of having a low specific impulse.

The ion rocket engine of this invention utilizes the contact-ionization principle wherein metal atoms such as alkali atoms are singly ionized upon contact with the surfaces such as tungsten or platinum. Because of the low ionization potential of an alkali atom, an electron from the atom becomes trapped in the high-work-function surface so that when the atom avaporates from the surface, the electron is left behind and the atom has a net positive charge. For this process to occur, the work function of the surface must be larger than the ionization potential of the atom, and since the presence of surface films of alkali atoms considerably reduces the work function, the ionizing surface must be only lightly covered at any instant; for example, only 1% coverage. To obtain practical values of ion current density from such surfaces, the dwell or residence time of the atom on the surface must be short; thus the surface temperature must be high. For the current densities required of an ion rocket engine, tungsten surface temperatures must be about 2000° F. when cesium is used as a propellant. The ions formed on the surface of the tungsten plate which is called the ion source or ion emitter are accelerated rearward with electrostatic fields. Electrons are then fed into the ion beam to microscopically neutralize the beam, and to avoid any charge accumulation on the vehicle. As can be seen, when the atoms bombard the emitter surface and the positive ions are created, the electrons created would tend to be left on the surface of the emitter and the vehicle would build up a highly negative charge. The ions that are accelerated from the engine would tend to seek the most negative area and would, as a result, return and accumulate around the engine, thus strongly inhibiting the propulsive effect. To prevent this, the electrons formed on the emitter surface are pumped back into the ion beam, as previously mentioned, and serve to neutralize this beam, preventing the charge accumulation.

The major ion rocket components are: (1) propellant supply system; (2) ion source or ion emitter; (3) ion accelerator; and (4) an electron emitter. The gaseous propellant feed system is most feasible since the propellant flow rates are quite low. The propellant supply system consists of a vaporizer and a distribution-control system. For supplying reactive alkali metals to the engine, the metal is loaded into a small glass ampule working in a dry nitrogen atmosphere. One or more of these ampulses are then placed into the propellant vaporizer of the engine and are broken to release the propellant when desired. The vaporizer consists of a control temperature container in which some liquid propellant is maintained. The pressure in the vaporizer is then the vapor pressure corresponding to the propellant liquid temperature. All other parts of the vaporizer are kept at temperatures equil to or higher than that of the control temperature basin to avoid condensation. This may be accomplished by jacketing the entire vaporizer and circulating thermostatically-controled fluid through the jacket. Propellant vapor issues from the vaporizer through a cluster of orifices which are arranged to distribute the vapor in the desired pattern as it flows into the ion source. In the surface ionization used in this invention, it is desired to have a uniform vapor distribution. Propellant flow rate can be varied by varying the propellant liquid temperature in the vaporizer.

The ion source or ion emitter is a surface of material that has a high electron work function such as tungsten, platinum, or tungsten oxide. It is found that alkali metals, which have the lowest ionization potentials of any family of metals, can be ionized to varying degrees by bringing them into contact with such materials. Cesium, for example, is almost 100% ionized over a range of temperatures from 1200° to 2200° K.

In the engine of this invention the ion accelerator is a grid of tightly stretched parallel wires. When the accelerator is a distance of 1 millimeter from the surface of the ion source and a potential difference of 1059 volts is maintained between the ion source surface and the accelerator wire, a specific impulse corresponding to 4000 seconds is obtained with cesium ions. The efficiency of the engine, that is, the percent of ions produced, is a function of both the potential gradient between the surface of the ion source and the accelerator and is additionally a function of the distance between the ion source and the ion accelerator.

The electron emitter is a second grid of closely spaced wires which are similar in configuration to the ion accelerator and can be located as close as 1 millimeter to the accelerator. As previously pointed out, the electron emitter serves to neutralize the ion beam by injection of electrons. The electrons that are emitted from this emitter are those electrons that were left on the surface of the ion source and have been pumped by an electric generator or other means from this source into the electron emitter. The electron emitter may be attached to an electrical ground or this second set of grid wires may be operated at a positive potential relative to the first grid or accelerator in order to decelerate the ions. The advantage of an accelerate-decelerate system for ion rockets is that it permits higher current density from the emitting surface and also provides a potential gradient at the back of the engine that will prevent electrons from flowing upstream to the ion source.

An object of this invention is to provide a novel ion rocket engine.

Another object of this invention is to provide an ion rocket engine utilizing grid electrodes of closely spaced wires.

Another object of this invention is to provide an ion rocket engine employing surface ionization.

Still another object of this invention is to provide an ion rocket engine having a shaped ion emitter.

Other objects and many attendant advantages of the present invention will be apparent from the following detailed description when taken together with the accompanying drawings in which:

FIG. 1 is a partially-sectioned elevational view of the ion rocket engine taken along line 1—1 of FIG. 2.

FIG. 6 is a graph depicting the relationship between voltage potential and distances between the electrodes and ion emitter.

Figure 2:
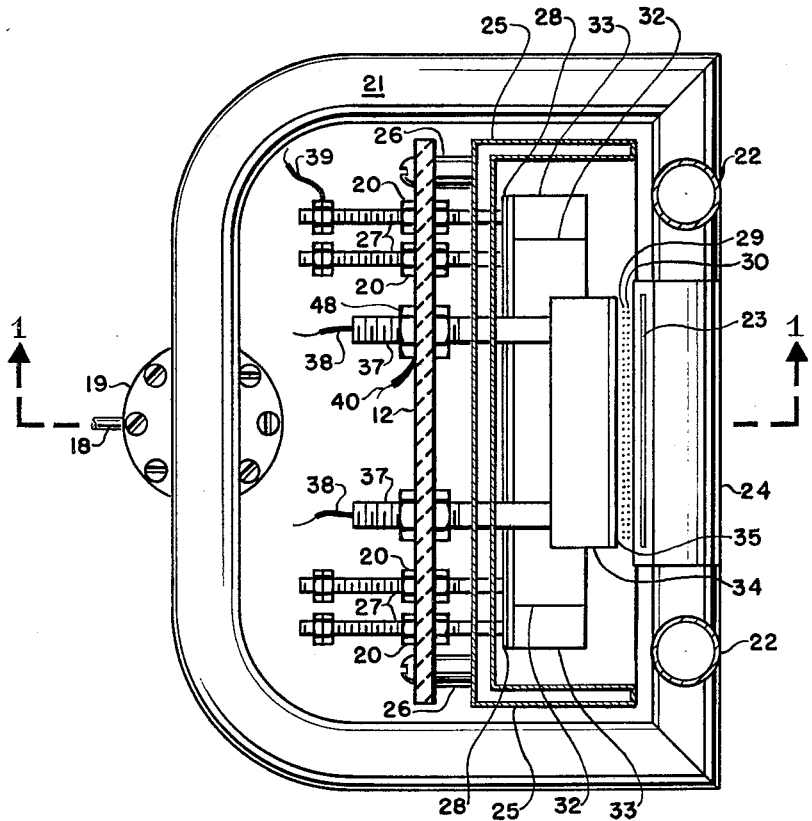
FIG. 2 is a plan view taken along line 2—2 of FIG. 1.

Referring now ot the drawings, wherein like reference characters designate like or corresponding parts throughout the several views, there is shown in FIGS. 1 and 2 the rocket engine 11 having a mounting plate 12. Rigidly attached to mounting plate 12 is a support member 13 to which may be fastened by screws 15 the vaporizer chamber 14. Glass ampule 16 of reactive metal is secured to the inside wall of the chamber 14 by brackets 17. A plunger 18 serves to break the glass ampule when it is desired to do so. The plunger 18 may be actuated by any conventional means, not shown. Vaporizer chamber 14 may be heated by various means, not shown, such as heating coils or a heating jacket surrounding the chamber. Chamber 14 may be of copper construction lined with nickel plating. Copper can be used because it is a good thermal conductor and the nickel plating is feasible since nickel will not react with an alkaline metal to the extent that copper does. Outlet 19 is rigidly attached to the chamber 14 and directs the vapors formed to conduit 21 which intersects tubing 22 which, in turn, carry the propellant to each side of the injectors 24. The detail of the conduit and tubing arrangement wherein the propellant is carried into the injector 24 can best be seen with reference to FIG. 4. These means used to carry the propellant to the injectors can be of stainless steel construction. The propellant is injected from the injectors 24 through longitudinal slits 23 therein to provide converging propellant sprays on the face 35 of the ion source 34. The propellant first crosses the wire grid 30 which is both the electron emitting grid and decelerating grid and then passes across wire grid 29 which is the accelerating grid onto the face 35 of the ion source 34. This process may be termed reverse-feeding but since the flow of ions away from the ionizing face 35 is the primary flow with which the engine is concerned, the accelerating grid 29 is said to be downstream relative to the ion flow and the electron emitting grid 30 is said to be downstream relative to this ion flow. The ionizing face 35 is radiantly heated by resistance heated coils 36. Electrical leads 38 which conduct the current to the coils 36 pass through the hollow threaded ionizer supports 37. Lock nuts 48 fasten the ion source 34 to the support plate 12. An electrical lead 40 is attached to a lock nut 48 which lead serves to carry the electrons away from the ionizing face 35. The two rows of grid wires 29 and 30 are suspended from thin sheets 31 of a refractory metal such as tantalum. The thin support sheets 31 for the electron emitting grid wires 30 are sandwiched between an L-shaped member 28 and a bar of refractory material 33 whereas the supporting sheet 31 for the accelerating grid wires 29 is sandwiched between the same type of L-shaped member 28 and a bar of a refractory metal 32. It should be pointed out that the bars 32 and 33 may both be of the same material and the use of two dissimilar materials herein disclosed has been shown merely by way of example. The L-shaped members 28 are secured to the mounting plate 12 by threaded members 27 which have lock nuts 20 to position them upon the plate 12. Two electrical connections 39 are fastened to the support members 27 of the electron emitting grid and a single electrical lead 41 is fastened to the support members 27 of the accelerating grid 29. The members 27 and 37 are insulated from the mounting plate 12 since it is important that the electrical currents do not leak from one member to another and that none of the current directed to a given set of grid wires or the ionizing face is lost through leakage. Surrounding the grid wires and their support members is a double walled chamber 25 which is fastened to the mounting plate 12, for example, by screw means 26. The purpose of this double walled chamber 25 is to permit as little heat radiation loss as possible from the engine. The greater the amount of heat that can be retained at the ionizing face, the greater the efficiency of the engine. The double walled chamber 25 may be of a metal construction or it could even have insulating material between the walls though it has not been shown in this specific example.

Figure 3:
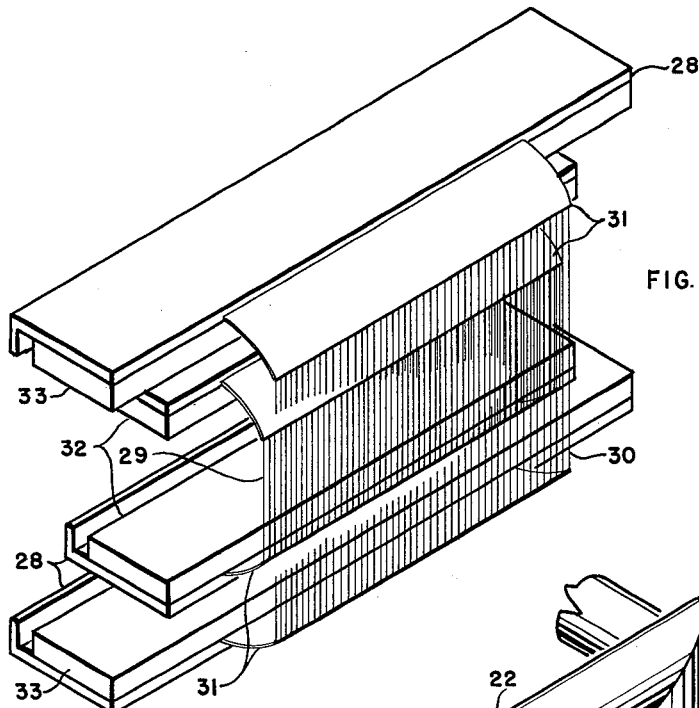
FIG. 3 is a somewhat schematic view of the grid electrodes of the ion rocket engine.

Referring now to FIG. 3, there is shown pictorially the electron emitting grid wires 30 which are suspended between the thin support sheets 31 of a refractory metal. The grid wires are usually of a refractory metal and are often comprised of the same material as the support sheets 31. The refractory metal sheets 31 are sandwiched between the longitudinal elongated L-shaped member 28 and the bar of either metal or refractory material 33. In the case of the accelerating grid wires, the support member 31 is sandwiched between an L-shaped member 28 and a bar 32 of either a refractory material or metal.

Figure 4:
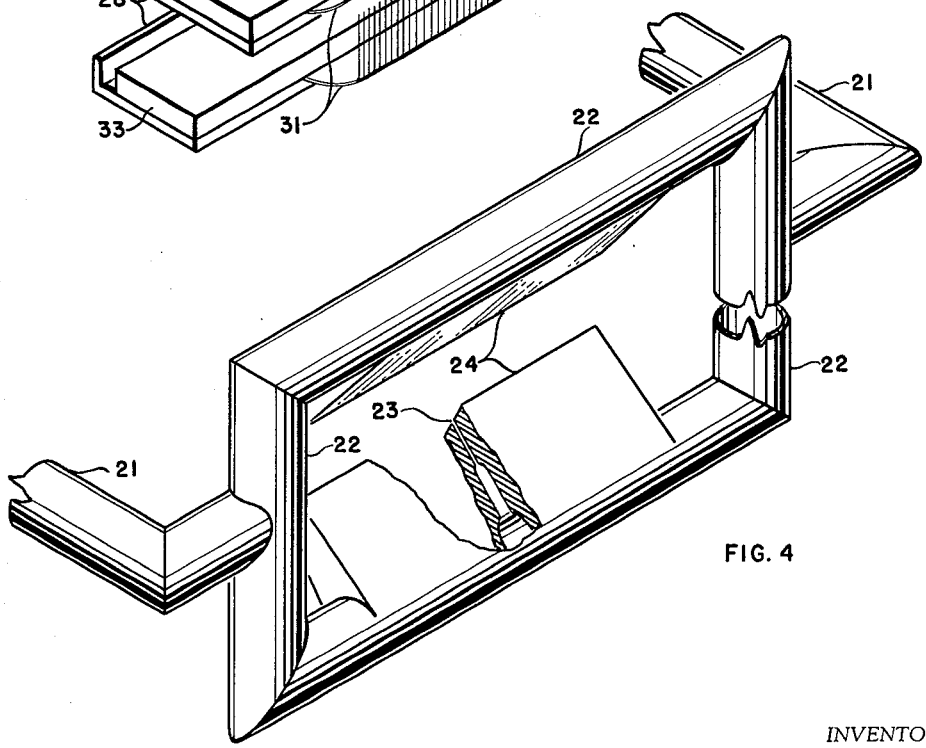
FIG. 4 is a pictorial view of the orifice and injector arrangement of the rocket engine.

Referring now to FIG. 4, there is shown the conduits 21 which direct the vapor from the vaporizer to the tubing 22 at the front of the engine. As can be seen, tubing 22 is rectangular in shape whereby the two elongated sides of the rectangle feed the propellant directly into the injector 24 so that the propellant may be admitted to the ionizing surface through the injecting slot 23.

Figure 5:
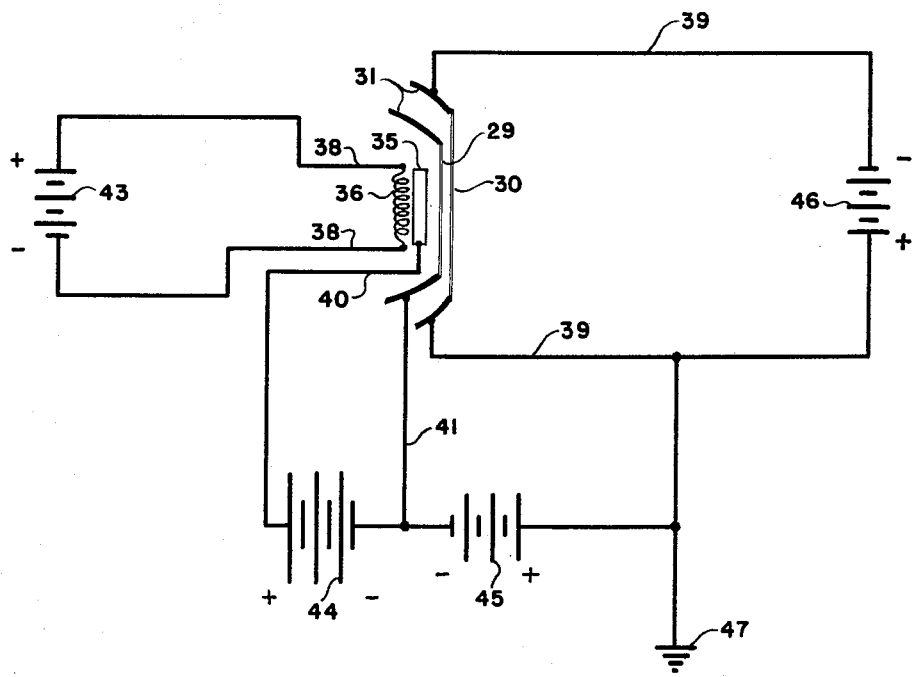
FIG. 5 is a schematic representation of the electrical wiring diagram of the rocket engine.

Referring now to FIG. 5 wherein a simplified typical electrical circuit is shown, there is shown a battery 44 situated between the ionizing face 35 and the accelerating grid wires 29 which battery has a larger voltage than the battery 45 situated between the accelerating grid wire 29 and the electron emitting grid wire 30. The batteries 44 and 45 are merely illustrative of the respective potentials which may be applied between the ionizing face 35, the accelerating grid wires 29, and the electron emitting grid wires 30. Thus it can be seen from the figure that the ionizing face 35 will be positive with respect to ground. The accelerating grid wires 29 will be negative with respect to ground and the electron emitting grid wires will be at essentially ground potential. The electrons accumulating on the ionizing face 35 are pumped away through the lead 40 onto the electron emitting grid wires 30 through the lead 39. However, to get the electrons emitted from the grid wires 30, it is necessary to provide a means to heat the wires so that they will emit these electrons. The grid wires 30 are heated by resistance heating through the low voltage and very high current provided by the battery 46. As can be seen from the wiring diagram, the electron emitting grid wires 30 are maintained at a potential that is positive in relation to the highly negative potential placed upon the accelerating grid wires 29. Thus, not only do the electron emitting grid wires neutralize the ion beam, but they also serve to decelerate the ions that are emitted. Additionally shown in the wiring diagram is the ionizer heating circuit which has the lead wires 38 connected to the heating coils 36. Battery 43 supplies the current to heat the coil 36. It is, of course, to be understood that appropriate power supplies could and would probably replace the batteries shown in most space applications of the engine. Furthermore, it is to be understood that in space flight applications the ground 47 would probably be the vehicle itself. Thus, the electron emitting grid wires 30 would not be maintained at a true ground potential of zero voltage. Thus, it is to be understood that in the term of reference herein used, ground is relative and that the important feature stressed is that the electron emitting grid wires 30 be maintained at a potential somewhat intermediate between that of the ionizer and the accelerating grid wire potential.

Referring now to the simplified graph shown in FIG. 6, there is seen that the net voltage is determined by the potential difference between the ionizer and the electron emitter or grid wires and this net voltage is directly proportional to the specific impulse obtained from the engine. It can also be seen from this graph that the slope of the line connecting the voltage of the ionizer and voltage of the accelerator, respectively, determines what is called the potential gradient. Between the ionizer and the accelerating grid wires it is desirable to have the largest potential gradient feasible since the slope of this line determines the amount of ions actually produced. As can be seen from the graph, the slope of the line connecting the ionizer and accelerator voltages is determined by both the voltages on the respective members and the distance between them. As can be readily seen, this graph is merely illustrative of the effect of the relative potential voltages on the ionizer, accelerator, and electron emitter.

Figure 7:
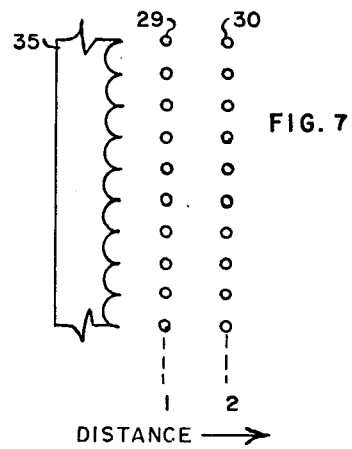
FIG. 7 is a schematic plan view showing a shaped ion emitting surface, accelerating grid, and electron emitting grid.

Referring now to FIG. 7, there is shown a particularly desirable and novel embodiment of the invention wherein a scalloped ionizer face 35 is shown to provide some electrostatic focusing of the ion between the grid wires 29 and 30. The focusing of the ions between the grid wires provides a higher efficiency. If the emitting surface is planar and no attempt is made to focus the particles away from the accelerating grid wires, then the fraction of the particles intercepted by the wires is approximately equal to the fractional area blockage due to the wires. However, in the cases where the electrostatic focusing of the particles is employed by the use of the scalloped emitting surface, the intercepted current can be reduced to 1% or less of the total current. In addition to using the scalloped emitting surface, a third set of grid wires may be added between the accelerating grid 29 and the ionizing face 35.

Obviously, many modifications and variations of the present invention are possible in the light of the above teachings. It is, therefore, to be understood that within the scope of the appended claims the invention may be practiced other than as specifically described.

We claim:

1. An ion rocket engine comprising in combination: support means; an ionizing source secured to said support means, propellant injector means positioned adjacent said ionizing source and so arranged that a propellant may be sprayed upon the surface of said ionizing source; propellant vaporizer means secured to said support means; means connecting said vaporizer means to said injector means; an ion accelerator comprising a grid of closely spaced wires disposed between said ionizing source and said injector means; said accelerating grid being suspended by arms secured to said support means; and an electron emitting grid of closely spaced wires disposed between said ion accelerating grid and said injector means, said electron emitting grid being suspended by arms secured to said support means.

2. An ion rocket engine comprising in combination: support means; an ionizing source secured to said support means; propellant injector means positioned adjacent said ionizing source and so arranged that a propellant may be sprayed upon the surface of said ionizing source; propellant vaporizer means secured to said support means; means connecting said vaporizer means to said injector means; an ion accelerator comprising a grid of closely spaced wires disposed between said ionizing source and said injector means, said accelerating grid being suspended by arms secured to said support means; an electron emitting grid of closely spaced wires disposed between said ion accelerating grid and said injector means, said electron emitting grid being suspended by arms secured to said support means; means to provide a potential difference between said face of said ionizing source and said accelerating grid, whereby said accelerating grid has a negative potential relative to said ionizing source; and means to conduct electrons remaining on said face of ionizing source from said source to said electron emitting grid and means to heat said electron emitting grid causing said emitting grid to emit electrons.

3. An ion rocket comprising, propellant supply means, injector means communicating with said supply means; an ionizing source, said injector means being positioned to direct propellant flow from said supply means against a face of said ionizing source, ion accelerator means positioned adjacent and parallel to said face of said ionizing source and between said ionizing source and said injector means, and electron emitter means positioned adjacent to and downstream from said ion accelerator means.

4. An ion rocket engine comprising, a propellant vaporizing chamber, injector means communicating with said chamber, an ionizing source for producing ions including an ionizing face positioned adjacent and parallel to said injector means, said injector means comprising an element having a plurality of nozzle slots, said slots being elongated in a direction parallel to said face and being arranged to provide converging propellant sprays on said face, an ion accelerator means disposed parallel to and between said ionizing source and said injector means for accelerating ions, and an electron emitter means positioned adjacent to and downstream of said ion accelerator means for emitting electrons into the accelerated ion stream.

References Cited in the file of this patent

UNITED STATES PATENTS

| | | |
|---|---|---|
| 2,754,442 | Boutry | July 10, 1956 |
| 2,880,337 | Langmuir et al. | Mar. 31, 1959 |
| 2,883,568 | Beam | Apr. 21, 1959 |
| 3,014,154 | Ehlers et al. | Dec. 19, 1961 |
| 3,050,652 | Baldwin | Aug. 21, 1962 |
| 3,052,088 | Davis et al. | Sept. 4, 1962 |